United States Patent
Zelz

(10) Patent No.: US 8,356,832 B2
(45) Date of Patent: Jan. 22, 2013

(54) METHOD FOR FOLDING IN OR FOLDING OUT AN ELECTRICALLY OPERATED TRAILER COUPLING, AND ELECTRICALLY OPERATED TRAILER COUPLING

(75) Inventor: Martin Zelz, Wiernsheim (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 295 days.

(21) Appl. No.: 12/721,675

(22) Filed: Mar. 11, 2010

(65) Prior Publication Data

US 2010/0230931 A1    Sep. 16, 2010

(30) Foreign Application Priority Data

Mar. 11, 2009  (DE) .................. 10 2009 012 709

(51) Int. Cl.
*B60D 1/54* (2006.01)
(52) U.S. Cl. ..................................... 280/491.1
(58) Field of Classification Search ............... 280/491.1, 280/491.2, 491.3, 491.4
See application file for complete search history.

(56) References Cited

U.S. PATENT DOCUMENTS

| | | | |
|---|---|---|---|
| 7,699,335 B2* | 4/2010 | Riehle et al. | 280/491.1 |
| 2007/0007749 A1* | 1/2007 | Gentner et al. | 280/491.1 |
| 2007/0138224 A1* | 6/2007 | Rimmelspacher et al. | 224/519 |
| 2008/0073874 A1* | 3/2008 | Riehle et al. | 280/511 |

* cited by examiner

*Primary Examiner* — Kevin Hurley
(74) *Attorney, Agent, or Firm* — Leydig, Voit & Mayer, Ltd.

(57) ABSTRACT

In a method for folding in or folding out an electrically operated trailer coupling for vehicles which can be moved electrically between a folded-out use position and a folded-in rest position with excess force limitation, an actuating device is provided for activating the trailer coupling. A brief actuation of the actuating device results in an automatic adjusting movement of the trailer coupling in the folding-in or folding-out direction. In the method, in the event of a continuous actuation of the actuating device, the excess force limitation threshold is increased during the automatic adjusting process of the trailer coupling, and after the actuating device is released, the automatic adjusting process is continued with the original excess force limitation threshold until the trailer coupling has reached its use or rest position.

2 Claims, 3 Drawing Sheets

METHOD FOR FOLDING IN OR FOLDING OUT AN ELECTRICALLY OPERATED TRAILER COUPLING, AND ELECTRICALLY OPERATED TRAILER COUPLING

CROSS-REFERENCE TO RELATED APPLICATION

This application claims the priority, under 35 U.S.C. §119, of German application DE 10 2009 012 709.7, filed Mar. 11, 2009; the prior application is herewith incorporated by reference in its entirety.

BACKGROUND OF THE INVENTION

Field of the Invention

The invention relates to a method for folding in or folding out an electrically operated trailer coupling for vehicles which can be moved electrically between a folded-out use position and a folded-in rest position with excess force limitation. An actuating device is provided for activating the trailer coupling, and a brief actuation of the actuating device results in an automatic adjusting movement of the trailer coupling in the folding-in or folding-out direction.

The prior art discloses trailer couplings which can be fastened to a vehicle and which can be pivoted by an activatable motor between a use position and a rest position. The trailer coupling can be connected to the vehicle, for example, by fastening plates in order to transmit acting forces into the vehicle chassis. Here, the ball rod or the ball neck pivots in and out for example at the touch of a button. The operation may take place by an operating button in the interior of the vehicle, for example in the luggage compartment, or optionally by remote operation.

It is generally conventional in the case of electrically pivotable trailer couplings to implement a "manual mode" (button operation) and an "automatic mode" (tapping operation). Excess force limitation is conventionally active or provided both in the manual mode and automatic mode. Here, the excess force limitation is higher in the manual mode than in the automatic mode. In this way, it is possible for any hindrance in the automatic mode, which would normally trigger a reversal, to be overrun by the manual mode.

In the manual mode, the trailer coupling accordingly pivots only when the operating button is actuated constantly (continuously). When the operating button is released, the pivoting movement is stopped. The disadvantage is therefore the fact that the trailer coupling pauses in intermediate positions when the operating button is released, and the operator must keep the operating button pressed continuously in order to fully deploy or fully retract the trailer coupling.

SUMMARY OF THE INVENTION

It is accordingly an object of the invention to provide a method for folding in or folding out an electrically operated trailer coupling, and an electrically operated trailer coupling which overcome the above-mentioned disadvantages of the prior art methods and devices of this general type, which trailer coupling ensures a reliable adjustment of the trailer coupling into its respective end positions.

In an embodiment, the present invention provides a method for one of folding in and folding out an electrically operated trailer coupling for vehicles which can be moved electrically between a folded-out use position and a folded-in rest position with excess force limitation. The method includes performing an automatic adjusting movement of the trailer coupling in one of a folding-in direction and a folding-out direction with a first excess force limitation threshold during an automatic adjusting process in response to a tapping actuation of an actuating device. The excess force limitation threshold is increased during the automatic adjusting process of the trailer coupling in response to a continuous actuation of the actuating device. After the actuating device is released, the automatic adjusting process is continued with the first excess force limitation threshold until the trailer coupling has reached one of a use position and a rest position.

The main advantages which can be obtained with the invention are that, by the method or by the corresponding trailer coupling, it can be ensured that triggered adjusting processes in the folding-in or folding-out direction are reliably ended, specifically without the trailer coupling pausing in undesired intermediate positions.

This is obtained substantially by a method which is characterized in that, in the event of a continuous actuation of the actuating device, the excess force limitation threshold is increased during the automatic adjusting process of the trailer coupling, wherein after the actuating device is released, the automatic adjusting process is continued with the original excess force limitation threshold until the trailer coupling has reached its final use or rest position. This has the advantage that no undesired pausing takes place in intermediate positions, since the adjusting process is continued with the normal excess force limitation threshold in the automatic mode after the actuating device is released. It is therefore possible to dispense with a separate manual mode in which the trailer coupling is moved into the respective end position only by a continuous actuation of the actuating device.

It is for example provided that, in the event of a continuous actuation of the actuating device, the excess force limitation threshold is constantly raised and, in the event of the actuating device subsequently being released again, the excess force limitation threshold is reduced again to the original value which is set in the automatic mode. For example, the excess force limitation threshold may always be raised until it can be ensured that hindrances in the automatic mode can be reliably overrun.

The invention also relates to an electrically operated trailer coupling for use in vehicles, having a coupling unit which can be folded in or folded out electrically, having an actuating device for activating the coupling unit, and having a corresponding control device for carrying out the method according to the invention.

Other features which are considered as characteristic for the invention are set forth in the appended claims.

Although the invention is illustrated and described herein as embodied in a method for folding in or folding out an electrically operated trailer coupling, and an electrically operated trailer coupling, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
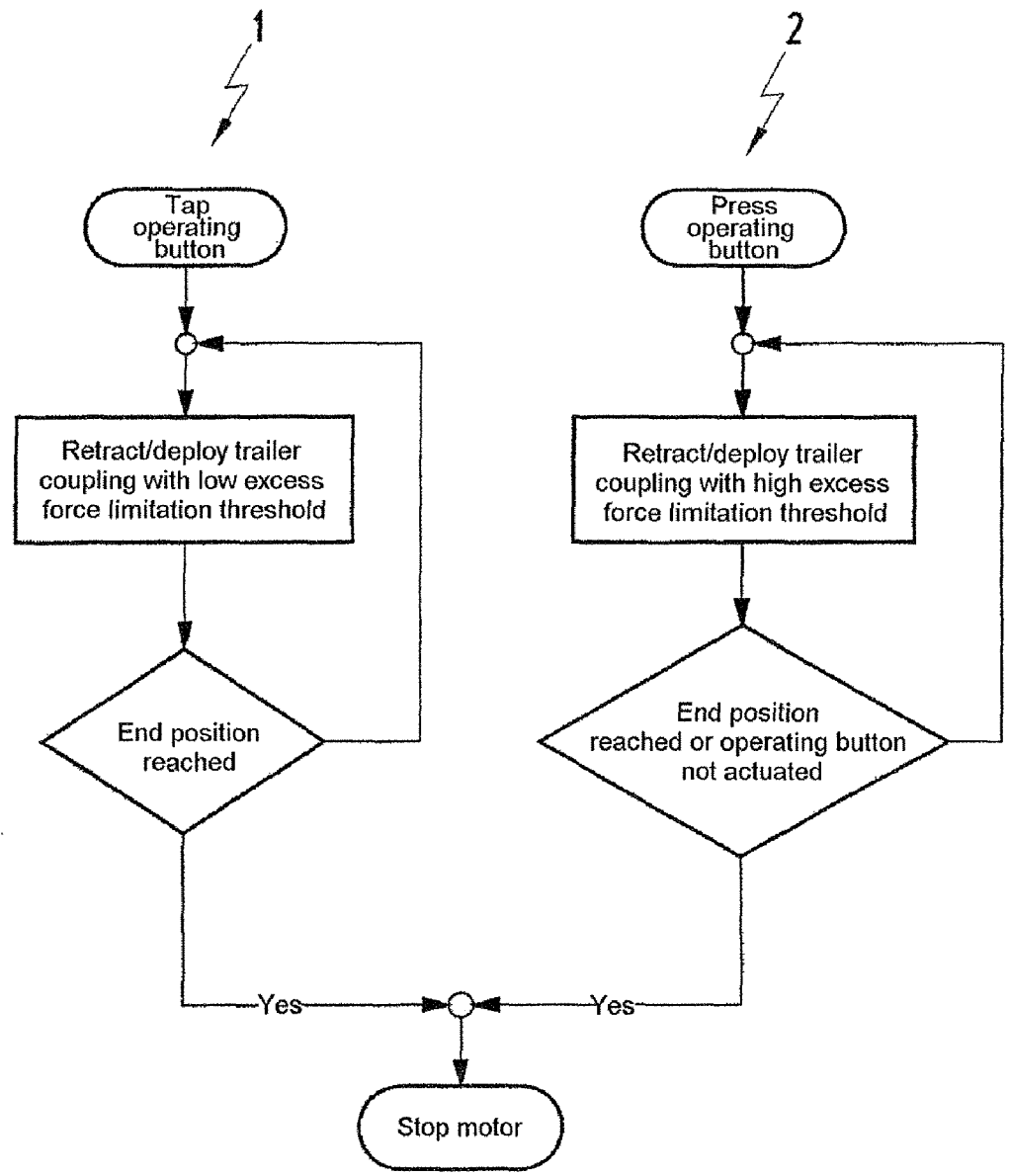
FIG. 1 is a flow chart illustrating an adjusting process according to the prior art.

Referring now to the figures of the drawing in detail and first, particularly, to FIG. 1 thereof, there is shown a schematic functional diagram illustrating an adjusting process of an electrically operated trailer coupling according to the prior art.

The electrically operated trailer coupling can be operated in an automatic mode 1 and with a manual mode 2.

If the operating button (actuating device) is actuated by being tapped, the automatic mode starts and the trailer coupling is retracted or deployed with a low excess force limitation threshold. If the trailer coupling reaches its respective end position (rest or use position), the electric drive for adjusting the electrically operated trailer coupling is stopped.

If unanticipated hindrances arise during the adjusting process in the automatic mode, the operating arrangement provides a manual mode 2 by which any hindrances in the automatic mode can be overrun. For this purpose, the operating button must be actuated continuously, as a result of which the excess force limitation threshold is raised and the respective hindrance can be overrun.

If the operating button is released, the manual mode of the trailer coupling stops and the trailer coupling remains in the respective intermediate position. The trailer coupling can be moved into its respective desired end position by re-starting the automatic mode or manual mode.

Figure 2:
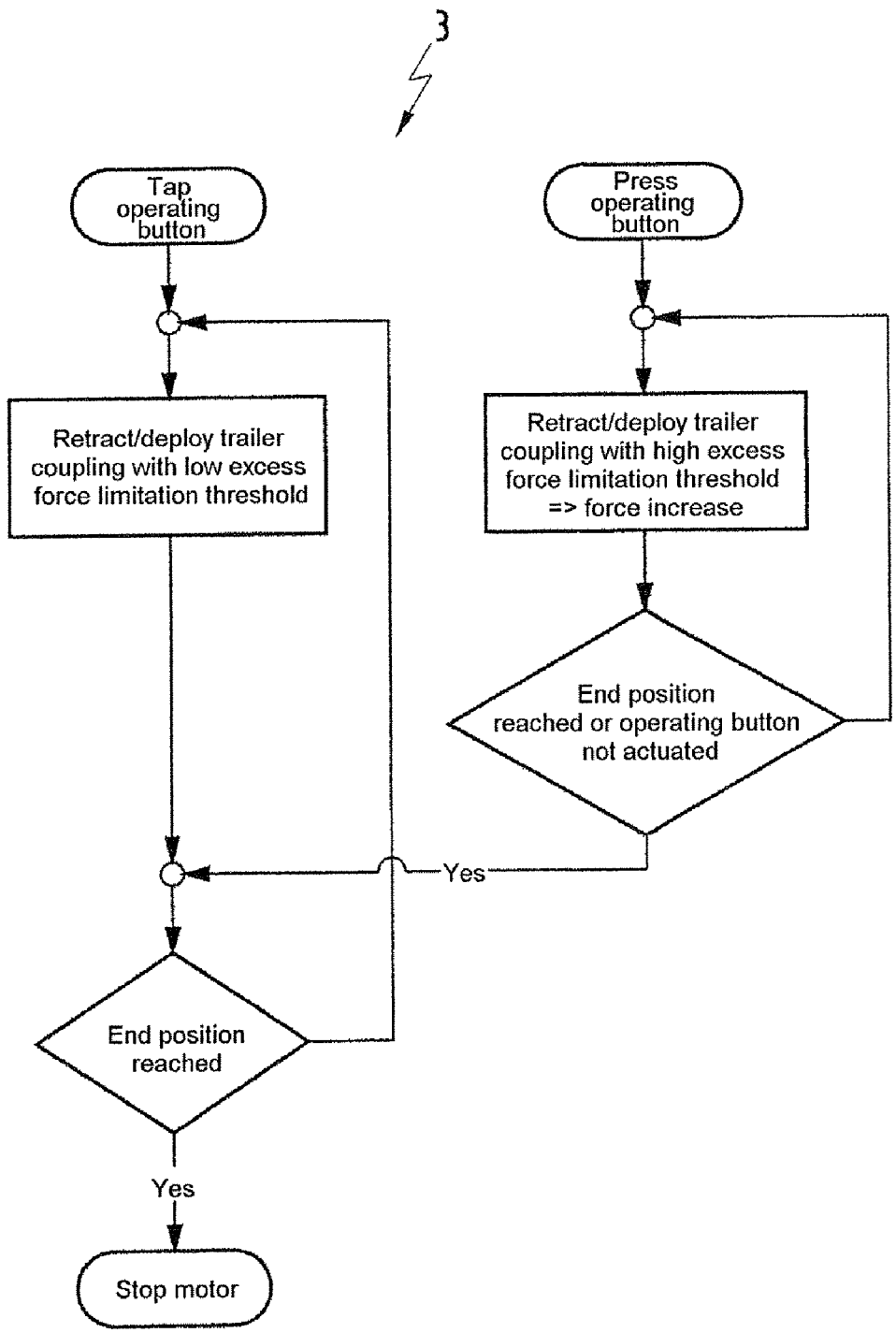
FIG. 2 is a flow chart illustrating a method according to the invention.
Figure 3:
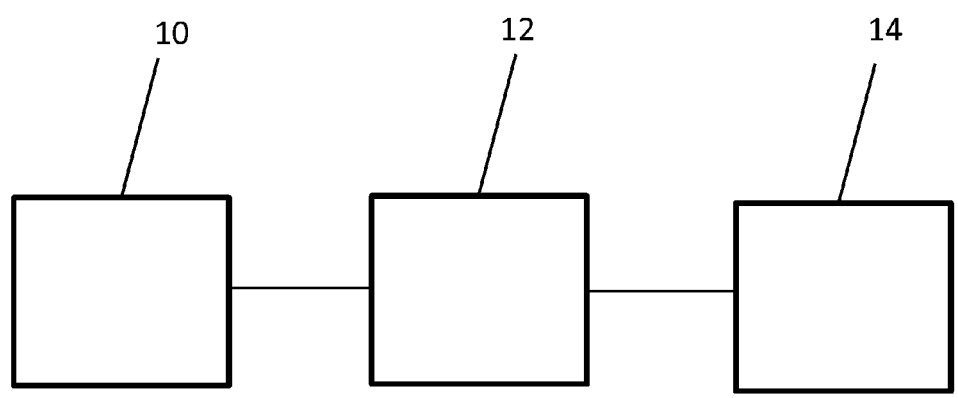
FIG. 3 schematically shows an electrically operated trailer coupling in accordance with an embodiment of the invention.

FIG. 2 shows a schematic functional diagram illustrating the method according to the invention for adjusting an electrically operated trailer coupling, which is schematically shown in FIG. 3. The electrically operated trailer coupling includes a coupling unit 10, which can be folded in or folded out electrically, having an actuating device 12 for activating the coupling unit, and having a corresponding control device 14 for carrying out the method shown in FIG. 2.

Here, the electrically operated trailer coupling is operated fundamentally in the automatic mode 3.

If the operating button (actuating device) is actuated by being briefly tapped, the automatic mode starts and the trailer coupling is retracted or deployed with a low excess force limitation threshold. If the trailer coupling reaches its respective end position (rest or use position), the electric drive for adjusting the electrically operated trailer coupling is stopped.

If the trailer coupling is unanticipatedly hindered or halted during the adjusting process in the automatic mode, the method provides that, if the operating button (actuating device) is actuated continuously, the excess force limitation threshold is increased in order to ensure that the hindrance which has arisen in the automatic mode can be overrun.

In contrast to the prior art, the release of the operating button in this case does not lead to the trailer coupling coming to a standstill in an intermediate position, but rather leads to the adjusting process being ended automatically in the automatic mode. Consequently, the excess force limitation threshold is likewise automatically reduced to the original value for the automatic mode.

It may for example be provided that, if the operating button is actuated constantly, the excess force limitation threshold is increased constantly.

The invention claimed is:

1. A method for one of folding in and folding out an electrically operated trailer coupling for vehicles which can be moved electrically between a folded-out use position and a folded-in rest position with excess force limitation, the method comprising:
   performing an automatic adjusting movement of the trailer coupling in one of a folding-in direction and a folding-out direction with a first excess force limitation threshold during an automatic adjusting process in response to a tapping actuation of an actuating device;
   increasing the excess force limitation threshold during the automatic adjusting process of the trailer coupling in response to a continuous actuation of the actuating device; and
   continuing the automatic adjusting process with the first excess force limitation threshold until the trailer coupling has reached one of a use position and a rest position, after the actuating device is released.

2. The method according to claim 1, in response to the continuous actuation of the actuating device, the excess force limitation threshold is raised continuously and, in response to the release of the actuating device the excess force limitation threshold is reduced to the first excess force limitation threshold.

* * * * *